(12) United States Patent
Feng et al.

(10) Patent No.: US 9,835,313 B2
(45) Date of Patent: Dec. 5, 2017

(54) OPTICAL UNIT FOR LIGHT-EMITTING STRUCTURE, LIGHT-EMITTING STRUCTURE, AND LIGHT BOX INCLUDING THE LIGHT-EMITTING STRUCTURE

(71) Applicant: OSRAM GmbH, Munich (DE)

(72) Inventors: Yaojun Feng, Shenzhen (CN); Aiai Li, Shenzhen (CN); Yuanyuan He, Shenzhen (CN); Canbang Yang, Shenzhen (CN)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/917,305

(22) PCT Filed: Sep. 5, 2014

(86) PCT No.: PCT/EP2014/069009
§ 371 (c)(1),
(2) Date: Mar. 8, 2016

(87) PCT Pub. No.: WO2015/036339
PCT Pub. Date: Mar. 19, 2015

(65) Prior Publication Data
US 2016/0223165 A1   Aug. 4, 2016

(30) Foreign Application Priority Data

Sep. 12, 2013   (CN) .......................... 2013 1 0415578

(51) Int. Cl.
*F21V 5/00*   (2015.01)
*F21V 13/10*   (2006.01)
(Continued)

(52) U.S. Cl.
CPC ................ *F21V 13/10* (2013.01); *F21V 5/04* (2013.01); *F21V 7/00* (2013.01); *F21V 13/12* (2013.01);
(Continued)

(58) Field of Classification Search
CPC . F21V 13/10; F21V 29/70; F21V 5/04; F21V 7/00; F21V 13/12; G02B 19/0028;
(Continued)

(56) References Cited

U.S. PATENT DOCUMENTS 7,914,162 B1 * 3/2011 Huang .................... B60L 1/14
219/220
2004/0228131 A1 * 11/2004 Minano .................. F21V 5/04
362/307
(Continued)

FOREIGN PATENT DOCUMENTS

CN          203131576 U        8/2013
JP          2007103926 A       4/2007
JP    WO 2014033985 A1 *       3/2014   ........ G02F 1/133603

OTHER PUBLICATIONS

International Search Report based on application No. PCT/EP2014/069009 (4 pages) dated Nov. 21, 2014 (for reference purpose only).

*Primary Examiner* — Elmito Breval
*Assistant Examiner* — Glenn Zimmerman
(74) *Attorney, Agent, or Firm* — Viering, Jentschura & Partner mbB

(57) ABSTRACT

Various embodiments may relate to an optical unit for a light-emitting structure, a light-emitting structure, and a light box comprising the light-emitting structure. The optical unit includes a body and a light-blocking structure, wherein the body includes at least one reflective surface, wherein the light-blocking structure includes a first light-blocking structure and a second light-blocking structure, wherein the first light-blocking structure is formed in one piece with the body, and the second light-blocking structure is arranged in the first light-blocking structure, wherein the first light-blocking structure is arranged to at least partially surround (Continued)

the reflective surface, to block the light leaks from the reflective surface by the second light-blocking structure.

15 Claims, 3 Drawing Sheets

(51) Int. Cl.
*G02B 27/00* (2006.01)
*G02B 19/00* (2006.01)
*F21V 29/70* (2015.01)
*F21V 5/04* (2006.01)
*F21V 7/00* (2006.01)
*F21V 13/12* (2006.01)
*F21Y 101/00* (2016.01)

(52) U.S. Cl.
CPC .......... *F21V 29/70* (2015.01); *G02B 19/0028* (2013.01); *G02B 27/0018* (2013.01); *F21Y 2101/00* (2013.01); *G02B 19/0061* (2013.01)

(58) Field of Classification Search
CPC ............ G02B 27/0018; G02B 19/0061; F21Y 2101/02; F21Y 2101/00
USPC .............. 257/98; 362/241, 235, 248, 249.02, 362/296.01, 327, 300, 299
See application file for complete search history.

(56) References Cited

U.S. PATENT DOCUMENTS

| | | | |
|---|---|---|---|
| 2009/0065793 A1* | 3/2009 | Hon ........................ | H01L 33/60 257/98 |
| 2010/0039579 A1* | 2/2010 | Park .................. | G02F 1/133603 349/58 |
| 2011/0241028 A1* | 10/2011 | Park ...................... | H01L 33/486 257/88 |
| 2011/0317428 A1* | 12/2011 | Paik ......................... | F21K 9/23 362/294 |
| 2012/0235169 A1 | 9/2012 | Seko et al. | |
| 2013/0063935 A1* | 3/2013 | Thrailkill .............. | F21V 29/004 362/231 |
| 2013/0121000 A1* | 5/2013 | Lee ........................ | H01L 33/56 362/293 |
| 2013/0258663 A1* | 10/2013 | Woodgate ................. | F21K 9/00 362/236 |
| 2015/0260371 A1* | 9/2015 | Takatori ............ | G02F 1/133603 362/97.1 |

\* cited by examiner

OPTICAL UNIT FOR LIGHT-EMITTING STRUCTURE, LIGHT-EMITTING STRUCTURE, AND LIGHT BOX INCLUDING THE LIGHT-EMITTING STRUCTURE

RELATED APPLICATIONS

The present application is a national stage entry according to 35 U.S.C. §371 of PCT application No.: PCT/EP2014/069009 filed on Sep. 5, 2014, which claims priority from Chinese application No.: 201310415578.9 filed on Sep. 12, 2013, and is incorporated herein by reference in its entirety.

TECHNICAL FIELD

Various embodiments relate to an optical unit for a light-emitting structure, a light-emitting structure, and a light box including the light-emitting structure.

BACKGROUND

As a widely used illumination technology, the LED light-emitting technology has the advantages of high luminous intensity, long lifespan and high efficiency with low energy consumption. An illumination device or illumination module using an LED light source usually needs to have a good light distribution. Thus, the lens for an LED light source is often used in such illumination device or illumination module, to finally form the expected light distribution of emergent light by means of optical performance of the lens. However, in practical applications, light emerging from the lens usually forms stray light that is different from the main emergent light, and such stray light usually affects the actual optical performance of the illumination device or illumination module.

One related art solution proposes to use non-transparent printing—, which is disposed on a side surface of the lens of the illumination device, so that light, particularly stray light, from the light source of the lens will be blocked by the printing on the transparent side surface, and therefore the stray light cannot emerge to affect the main emergent light emerging from the lens. According to this design, although stray light can be blocked, the technology of forming printing on the transparent outer surface is relatively complicated, and the printing cannot withstand long-term influences from the outside, for example, friction, which will lead to deterioration or even loss of the light blocking effect. In addition, another related art solution proposes to use a non-transparent cover, dispose the cover outside the illumination device and make it abut against the outer surface of the illumination device, thereby achieving the effect of blocking stray light. However, the additional cover increases the cost of the illumination device.

SUMMARY

Various embodiments provide a novel optical unit for a light-emitting structure, a light-emitting structure, and a light box including the light-emitting structure. The optical unit according to various embodiments uses a novel light-blocking structure, which is simply connected with the body, such that the optical unit and the light-emitting structure including the optical unit can be easily manufactured and have the advantages of long service life and low cost.

Various embodiments provide an optical unit for a light-emitting structure, including a body and a light-blocking structure, wherein the body includes at least one reflective surface, wherein, the light-blocking structure includes a first light-blocking structure and a second light-blocking structure, wherein the first light-blocking structure is formed in one piece with the body, and the second light-blocking structure is arranged in the first light-blocking structure, wherein the first light-blocking structure is arranged to at least partially surround the reflective surface, to block light leaks from the reflective surface by the second light-blocking structure. According to this design, the second light-blocking structure can surround the body in a circumferential direction of the body and therefore fully surround the body, or in a lateral direction of the body and therefore at least partially surround the body, which thereby can provide the possibility of achieving light blocking effect on the side surface of the reflective surface of the body by means of the second light-blocking structure.

According to various embodiments, viewed from the section of the optical unit along the optical axis of a light source of the light-emitting structure, the light-blocking structure extends parallel with an optical axis of a light source of the light-emitting structure, to block the light leaks from the reflective surface. In this way, the light-blocking structure can be adapted to block, for example, the corresponding stray light which may emerge through the reflective surfaces of the body, thereby achieving targeted light blocking effect, and ensuring that the light which may emerge through the reflective surface of the body will not affect the light distribution of the main emergent light emerging which includes the light that exits directly or exits after being reflected by the reflective surface.

According to various embodiments, viewed from the section of the optical unit along the optical axis of a light source of the light-emitting structure, the light-blocking structure extends in an inclined manner with respect to the optical axis of a light source of the light-emitting structure, to block the light leaks from the reflective surface. With the light-blocking structure arranged inclined with respect to the optical axis of a light source of the light-emitting structure, the light-blocking structure may be adapted to block the stray light exiting through the reflective surface which may for example extend in various manners.

According to various embodiments, the first light-blocking structure is configured as a groove, wherein the groove extends to at least partially surround the reflective surface. The groove surrounding the reflective surface can correspondingly surround, for example, stray light emerging through the reflective surface of the body, so as to block the light, for example, in the circumferential direction.

According to various embodiments, the optical unit further includes a first partition wall and a second partition wall that extend from the body, wherein the first partition wall and the second partition wall are spaced apart from each other to form the groove. By means of the first partition wall and the second partition wall, it is possible to form the groove easily, which facilitates the manufacture of the light-blocking structure, and can block, for example, in a direction perpendicular to the optical axis of the light source, for example, stray light through the reflective surface of the body from emerging in the circumferential direction.

According to various embodiments, the second light-blocking structure is arranged in the groove for blocking the light leaks from the reflective surface. The second light-blocking structure can be configured to be accommodated in the groove, so as to be held in the optical axis direction of the light source by means of being form-fitted with the groove, and block, for example, in a direction perpendicular to the optical axis of the light source, for example, stray light from the light source from emerging in the circumferential direction.

According to various embodiments, the optical unit further includes a fixing structure extending from the second partition wall for fixing the optical unit at a predetermined installation position. According to this design, it is possible to form the simple connection between the fixing structure and the light-blocking structure, and such connection is conducive to the overall manufacturing of the optical unit. Moreover, it is also possible to achieve, by means of the extending direction of the fixing structure, the effect of the second light-blocking structure blocking, for example, in a direction perpendicular to the optical axis of the light source, for example, stray light from the light source from emerging in the circumferential direction.

According to various embodiments, the second light-blocking structure is made of an opaque material. With this material, it is possible to simply achieve the effect of blocking, for example, stray light in the circumferential direction.

According to various embodiments, the opaque material is a potting material. The potting material can be simply injected into the groove and held in the groove, to advantageously fit the shape of the groove, and achieve, by means of the extending direction of the groove, superior effect of blocking light in the circumferential direction of the light source. In addition, this design can be advantageously applied to outdoor environments, and maintain normal and continuous operation in outdoor environments.

According to various embodiments, the optical unit is an optical lens. While the optical lens being arranged with a light blocking structure, the stray light for example caused by the light leaks from the reflective surface can be blocked by the light blocking structure, so that the main emergent light which includes the light that exits directly from the optical lens and exits from the optical lens after being reflected by the reflective surface will not be affected by the stray light.

Various embodiments also provide a light-emitting structure, including a carrier and a light source arranged on the carrier, the light-emitting structure further includes an optical unit as described above, wherein the optical unit is arranged on the carrier and performs a secondary optical processing on light emitted from the light source. According to this design, light emerging from the optical unit has a preferable light distribution, and the case will not occur where light distribution of the light, for example, emerging along the optical axis of the light source becomes uneven due to the affection of, for example, stray light.

According to various embodiments, the light source is LED light source. The light-emitting structure provided with an LED light source can have the advantages of high luminous intensity and high efficiency with low energy consumption, and meet the user's requirements on light distribution or light intensity of the emergent light of the light-emitting structure.

According to various embodiments, the carrier includes a heat sink. Such heat sink can advantageously transfer and dissipate heat from, for example, the light source, to enable the light-emitting structure to operate stably.

Various embodiments further provide a light box, including a light-emitting structure as described above. The light box including the light-emitting structure can have favorable light distribution, and will not be affected by, for example, stray light, such that light distribution finally formed on the surface of the light box is more uniform.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
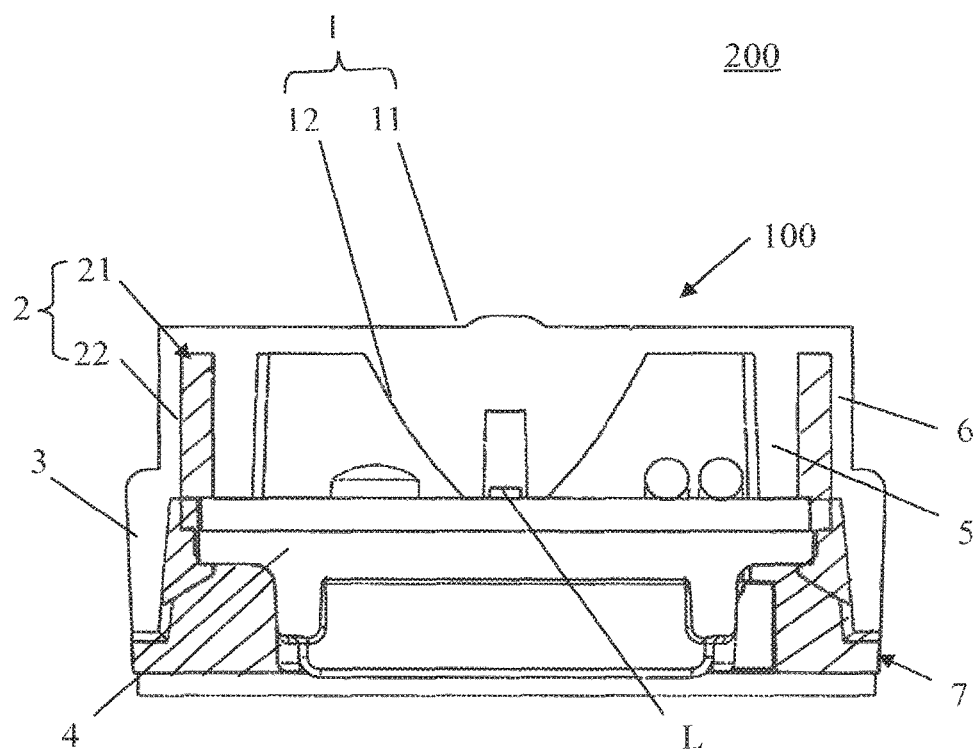
FIG. 1 is a section view of the light-emitting structure in transverse direction according to an embodiment of the present disclosure.

FIG. 1 is a section view of the light-emitting structure 200 in transverse direction according to an embodiment of the present disclosure. As shown in FIG. 1, the light-emitting structure 200 includes an optical unit 100 which includes a body 1 for processing light from a light source L, the body 1 includes an exit surface 11 through which light of the light source L exits, wherein the optical unit 100 can be implemented as an optical lens, the exit surface 11 therefore can be implemented as an exit surface 11 on the body 1 of the optical lens. The body 1 further includes a reflective surface 12 which is provided around the light source L and surrounds the light source L, and a portion of the light from the light source L emerges after being reflected by the reflective surface 12, and forms a part of emergent light of the light-emitting structure 200. The light source L can be configured as an LED light source, such that the light-emitting structure 200 has, for example, sufficient luminous intensity and long lifespan.

In addition, the light-emitting structure 200 further includes a light-blocking structure 2 for blocking stray light which is formed by, for example, a portion of the light from the light source L exiting directly through the reflective surface 12. In the absence of the light-blocking structure 2, such stray light will adversely affect the light distribution of the main emergent light which includes the light that exits directly and exits after being reflected by the reflective surface 12. By means of the light-blocking structure 2, light blocking effect can be achieved around the body 1, for example, in the circumferential direction surrounding the body 1, so that the stray light, for example, leaks from the reflective surface 12 will be blocked in the circumferential direction by the light-blocking structure 2 and cannot emerge.

Specifically, the light-blocking structure 2 is configured to include a first light-blocking structure 21 and a second light-blocking structure 22, wherein the first light-blocking structure 21 is configured to be formed in one piece with the body 1, and the second light-blocking structure 22 is configured to be accommodated in the first light-blocking structure 21 and block, for example, stray light. In addition, the first light-blocking structure 21 is configured to extend parallel with an optical axis of the light source L of the light-emitting structure 200, and is formed as a groove in the axial direction, wherein the groove is formed in one piece with the body 1, and extends for example along the longitudinal direction and therefore at least partially enclose the reflective surface 12. In this case, the longitudinal direction may represent the length direction of light-emitting structure. The groove is formed between a first partition wall 5 and a second partition wall 6 spaced apart from the first partition wall 5 as they extend from the exit surface 11, for, for example, accommodating the second light-blocking structure 22. Wherein in the embodiment, the optical unit 100 which is configured as an optical lens has an exit surface 11 configured on the body 1, the aforementioned first partition wall 5 and second partition wall 6 are respectively configured to extend outward from the exit surface 11. As shown in FIG. 1, viewed from the section of the optical unit 100, the first partition wall 5 and the second partition wall 6 can be arranged for example around the body 1 from inside to outside in turn, such that the second partition wall 6 enclose the first partition wall 5 and therefore forms the groove there between.

According to various embodiments, the second light-blocking structure 22 is made of a non-transparent material, preferably, a potting material. The potting material can be injected into the groove to, for example, fill the groove, and block stray light from the light source L emerging through the reflective surface 12. In addition, as shown in FIG. 1, a carrier 4 is disposed below the light source L of the light-emitting structure 200, and the carrier 4 can be preferably configured to include a heat sink, which works to dissipate heat from the light source L. By means of a fixing structure 3 extending from the second partition wall 6, an accommodating cavity can be formed between the fixing structure 3 and the carrier 4. The accommodating cavity can be configured to communicate with the groove, so that the potting material can be injected, for example, from an inlet 7 below the light-emitting structure 200, which not only will not damage the original structure and optical performance of the optical unit 100, but also can advantageously make the potting material flow into the groove and the accommodating cavity, and preferably fill the groove and the accommodating cavity, to cling to the carrier 4 surface and inner surfaces of the first and second partition wall 6s, so as to finally achieve good light blocking effect of blocking stray light from the light source L. The potting material not only can advantageously block stray light, but also can advantageously resist the complicated environments in outdoor applications, for example, resist water or dust, so as to realize the long service life and stable operation effects of the light-blocking structure 2.

Figure 2:
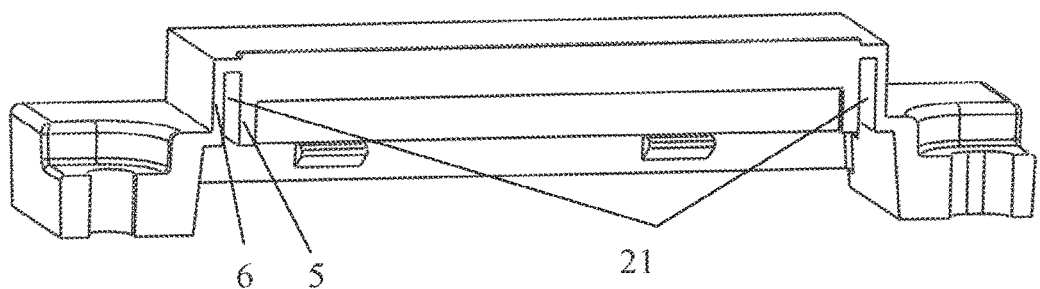
FIG. 2 is a section view of the optical unit in longitudinal direction according to an embodiment of the present disclosure.

FIG. 2 is a section view of the optical unit 100 in longitudinal direction according to an embodiment of the present disclosure. As shown in FIG. 2, the first light-blocking structure 21, namely the groove, can be also formed along the transverse direction, wherein the transverse direction may represent the width direction of the light-emitting structure in this case, thus provides a light blocking structure surrounding the body of the optical unit 100 in cooperation with the groove that is formed along the longitudinal direction.

It is understood for the person in the art that the extent to which the light-blocking structure 2 inclines with respect to the optical axis of the light source L may vary as the way the reflective surfaces 12 extend or the inclined extent of the axis of the light source L of the light-emitting structure 200 may vary. Moreover, in this case where the optical unit 100 configured as an optical lens, the exit surface 11 can consist of the outer surface of the lens through which the light exits. However, it is also understood that the optical unit 100 in this case may be configured as a different optical device than the optical lens, wherein for example the stray light leaks from the reflective surface 12 may also be blocked by the arrangement of the light-blocking structure 2.

Figure 3:
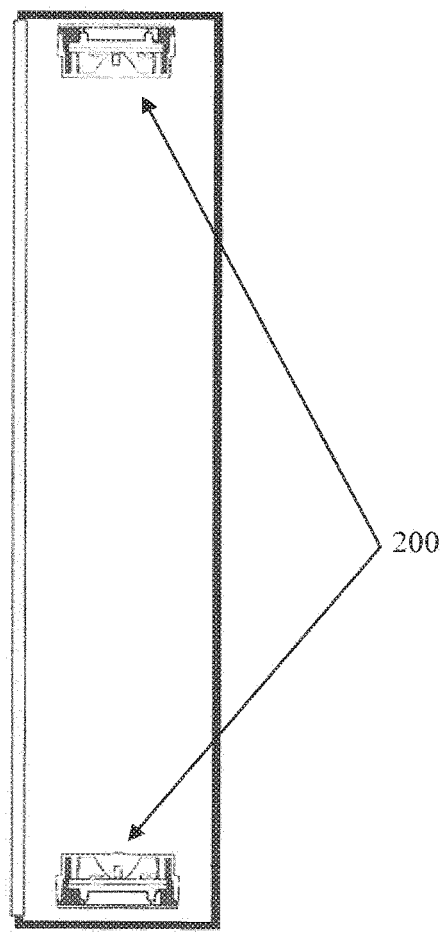
FIG. 3 is a section view of the light box according to an embodiment of the present disclosure.

FIG. 3 is a section view of the light box 300 according to an embodiment of the present disclosure. As shown in FIG. 3, the light-emitting structure 200 according to the embodiment of the present disclosure can be provided, for example, at both the upper and lower ends of the light box 300. The light box 300 including the light-emitting structures 200 can, for example, have uniform light distribution formed on two side surfaces of the light box 300. Since the light-blocking structure 2 of the light-emitting structure 200 can advantageously block stray light, improved and superior light distribution can be formed on the side surfaces of the light box 300.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. An optical unit for a light-emitting structure, comprising a body and a light-blocking structure, wherein the body comprises at least one reflective surface, wherein the light-blocking structure comprises a first light-blocking structure and a second light-blocking structure, wherein the first light-blocking structure is formed in one piece with the body, and the second light-blocking structure is arranged in the first light-blocking structure, wherein the first light-blocking structure is arranged to at least partially surround the reflective surface, to block the light leaks from the reflective surface by the second light-blocking structure.

2. The optical unit according to claim 1, wherein, viewed from the section of the optical unit along the optical axis of a light source of the light-emitting structure, the light-blocking structure extends parallel to the optical axis of a light source of the light-emitting structure, to block the light leaks from the reflective surface.

3. The optical unit according to claim 1, wherein, viewed from the section of the optical unit along the optical axis of a light source of the light-emitting structure, the light-blocking structure extends in an inclined manner with respect to the optical axis of a light source of the light-emitting structure, to block the light leaks from the reflective surface.

4. The optical unit according to claim 1, wherein the first light-blocking structure is configured as a groove, wherein the groove extends to at least partially surround the reflective surface.

5. The optical unit according to claim 1, wherein the second light-blocking structure is made of an opaque material.

6. The optical unit according to claim 1, wherein the optical unit is an optical lens.

7. The optical unit according to claim 4, wherein the optical unit further comprises a first partition wall and a second partition wall that extend from the body parallel to the optical axis of a light source of the light emitting structure, wherein the first partition wall and the second partition wall are spaced apart from each other to form the groove.

8. The optical unit according to claim 4, wherein the optical unit further comprises a first partition wall and a second partition wall that extend from the body in an inclined manner with respect to the optical axis of a light source of the light-emitting structure, wherein the first partition wall and the second partition wall are spaced apart from each other to form the groove.

9. The optical unit according to claim 5, wherein the opaque material is a potting material.

10. The optical unit according to claim 7, wherein the second light-blocking structure is arranged in the groove for blocking the light leaks from the reflective surface.

11. The optical unit according to claim 7, wherein the optical unit further comprises a fixing structure extending from the second partition wall for fixing the optical unit at a predetermined installation position.

12. A light-emitting structure, comprising a carrier and a light source arranged on the carrier,
wherein the light-emitting structure further comprises an optical unit,
the optical unit comprising a body and a light-blocking structure, wherein the body comprises at least one reflective surface, wherein the light-blocking structure comprises a first light-blocking structure and a second light-blocking structure, wherein the first light-blocking structure is formed in one piece with the body, and the second light-blocking structure is arranged in the first light-blocking structure, wherein the first light-blocking structure is arranged to at least partially surround the reflective surface, to block the light leaks from the reflective surface by the second light-blocking structure
wherein the optical unit is arranged on the carrier and performs a secondary optical processing on light emitted from the light source.

13. The light-emitting structure according to claim 12, wherein the light source is LED light source.

14. The light-emitting structure according to claim 12, wherein the carrier comprises a heat sink.

15. A light box comprising at least one light-emitting structure
the light-emitting structure comprising a carrier and a light source arranged on the carrier,
wherein the light-emitting structure further comprises an optical unit,
the optical unit comprising a body and a light-blocking structure, wherein the body comprises at least one reflective surface, wherein the light-blocking structure comprises a first light-blocking structure and a second light-blocking structure, wherein the first light-blocking structure is formed in one piece with the body, and the second light-blocking structure is arranged in the first light-blocking structure, wherein the first light-blocking structure is arranged to at least partially surround the reflective surface, to block the light leaks from the reflective surface by the second light-blocking structure,
wherein the optical unit is arranged on the carrier and performs a secondary optical processing on light emitted from the light source.

\* \* \* \* \*